United States Patent [19]

Bock

[11] Patent Number: 5,012,275
[45] Date of Patent: Apr. 30, 1991

[54] RIGHT-TO-LEFT SCANNING SYSTEM FOR COPYING DOCUMENTS OR BOUND BOOKS

[75] Inventor: Edward C. Bock, Webster, N.Y.

[73] Assignee: Xerox Corporation, Stamford, Conn.

[21] Appl. No.: 495,193

[22] Filed: Mar. 19, 1990

[51] Int. Cl.$^5$ .................... G03B 27/32; G03B 27/52
[52] U.S. Cl. ........................................ 355/25; 355/233
[58] Field of Search .................... 355/25, 75, 51, 67, 355/82, 233, 234, 235, 236, 230, 231

[56] References Cited

U.S. PATENT DOCUMENTS

| | | | |
|---|---|---|---|
| 3,656,848 | 4/1972 | Bentzman | 355/234 |
| 3,726,598 | 4/1973 | Difulvio et al. | 355/25 X |
| 3,775,008 | 11/1973 | Schaeffer et al. | 355/18 |
| 4,068,950 | 1/1978 | Kito | 355/75 |
| 4,158,497 | 1/1979 | Suzuki et al. | 355/51 X |
| 4,204,730 | 5/1980 | Miyashita et al. | 355/233 |
| 4,270,858 | 1/1981 | Minoura et al. | 355/66 X |
| 4,274,733 | 6/1981 | Sugiura et al. | 355/233 |
| 4,415,255 | 11/1983 | Huber et al. | 355/75 X |
| 4,428,663 | 1/1984 | Ito et al. | 355/233 |
| 4,500,197 | 2/1985 | Dannatt | 355/8 |
| 4,630,127 | 12/1986 | Fuwa | 355/235 |
| 4,711,554 | 12/1987 | Nishimori | 355/25 X |

FOREIGN PATENT DOCUMENTS 2158599 11/1985 United Kingdom ................. 355/75

Primary Examiner—L. T. Hix
Assistant Examiner—K. Dang

[57] ABSTRACT

An imaging system which uses a right-to-left scanning operation is enabled by first detecting by an optical sensor the right hand edge of a document to be copied, the left edge of the document being registered at the left edge of the platen. The scanning operation is initiated at the detected right hand edge and proceeds to the left. The end of scan coincides with the left registration edge. Book copying is enabled by adding a sloping left edge to the platen placing the book to be copied over the edge corner. The optical system is rotated for a book copy mode so that light penetrating the binding area is transmitted along the optical path. This arrangement allows required pre-scan excursion to take place in the space to the right of the start of scan position, thus avoiding interference with the sloping book edge.

4 Claims, 3 Drawing Sheets

RIGHT-TO-LEFT SCANNING SYSTEM FOR COPYING DOCUMENTS OR BOUND BOOKS

BACKGROUND AND MATERIAL DISCLOSURE STATEMENT

The present invention relates to a scanning system adapted to scan a flat document, or a bound document, such as a book. More particularly, the invention is directed toward a scanning system which detects the right hand edge of a book or document and accomplishes the scan function in a right-to-left scan.

Conventionally, prior art scan systems register a document on the left hand of a document platen and enable a scanning system which scans the document from left-to-right; that is, from the beginning of scan at the registration position to an end of scan location which is set for the length consistent with the document to be copied. This scanning orientation is satisfactory for most applications, but is less than satisfactory for those systems which afford a book copying capability by modifying a platen so as to have an angled edge portion sloping generally downward, whereby the bound part of a book is held to the corner position of the platen so that the entire surface of one page may be placed in intimate contact with the surface of the platen. Examples of such a system are disclosed in U.S. Pat. Nos. 3,775,008 and 4,068,950. Prior art copiers utilizing the corner book edge feature require a leftward pre-scan motion which inhibits required movement of the scanning mirrors. The problem presented by the pre-scan requirement is best illustrated by reference to FIG. 1. FIG. 1 shows a prior art, full-rate, half-rate, scanning system which is conventional for most present day commercial copiers. A book 10, opened to the 180° position, is placed on the surface of platen 12. A scanning system includes an illumination lamp 14 and a full rate scan mirror 16. Lamp 14, associated reflector 15, and mirror 16 are adapted to move, as a unit, from left to right beneath the platen at a full rate (scanning) speed. A corner mirror assembly 18 is adapted to move from left to right at ½ the scanning speed to maintain a constant system conjugate. The image is reflected along optical axis 19, projected through lens 20 and reflected through mirror 22 onto the surface of a photoreceptor drum 28. This type of system requires that the scanning mirror undergo a pre-scan excursion to the left prior to initiation of the scan exposure cycle, with initial acceleration (and vibration damping) taking place in the pre-scan zone shown as PS. Distance PS is typically about 1½". The start of scan position is identified as point $S_0$. If an attempt is made to modify this prior art system by adding a book edge (shown dotted), the pre-scan motion of assembly 18 would be constrained because the assembly would run into the book edge before the pre-scan motion is complete. A prior art method and apparatus relating to a tilted scan mirror and lens to enable scanning into a book binding area is disclosed in co-pending U.S. patent application Ser. No. 07/276,589, assigned to the same assignee as the present invention whose contents are hereby incorporated by reference. This disclosure does not describe a right-to-left scan wherein the book or document edge is detected by a sensor array.

The present invention is directed to an electrophotographic reproduction machine which incorporates a platen having an angled book edge and which utilizes a scanning system which scans from right-to-left (instead of the conventional left-to-right). By changing the scan direction the need for a pre-scan distance PS is eliminated and replaced by a much shorter distance ES (end of scan) in which the scan components are stopped and the reverse scan implemented. The invention can be practiced in a normal document scan mode or in a book scan mode. In either mode of operation the document registration edge (start of scan position) is sensed by a sensor mounted to the scan carriage. The invention may be used in either a light lens scanning system using off-axis imaging to enable scanning into the center of a book binding area, or, alternatively, the invention can be used in a RIS type scanning system wherein a tilted gradient index lens array is used to transmit images from along the document surface, including the book binding area onto a photosensor array such as a CCD array.

More particularly, the invention is directed to an optical scanning and imaging system for scan/illuminating a document placed on a document platen and for projecting an image along an optical path onto a photosensitive image medium to form a latent image of the document thereon, said optical scanning and imaging system comprising, in combination, an elongated illumination means adapted to incrementally scan/illuminate said document beginning at a start of scan position $S_0$ coinciding with the right-hand edge of said document, and an imaging means for transmitting light reflected from said document along an optical path onto said image media.

DESCRIPTION OF THE INVENTION

Figure 2:
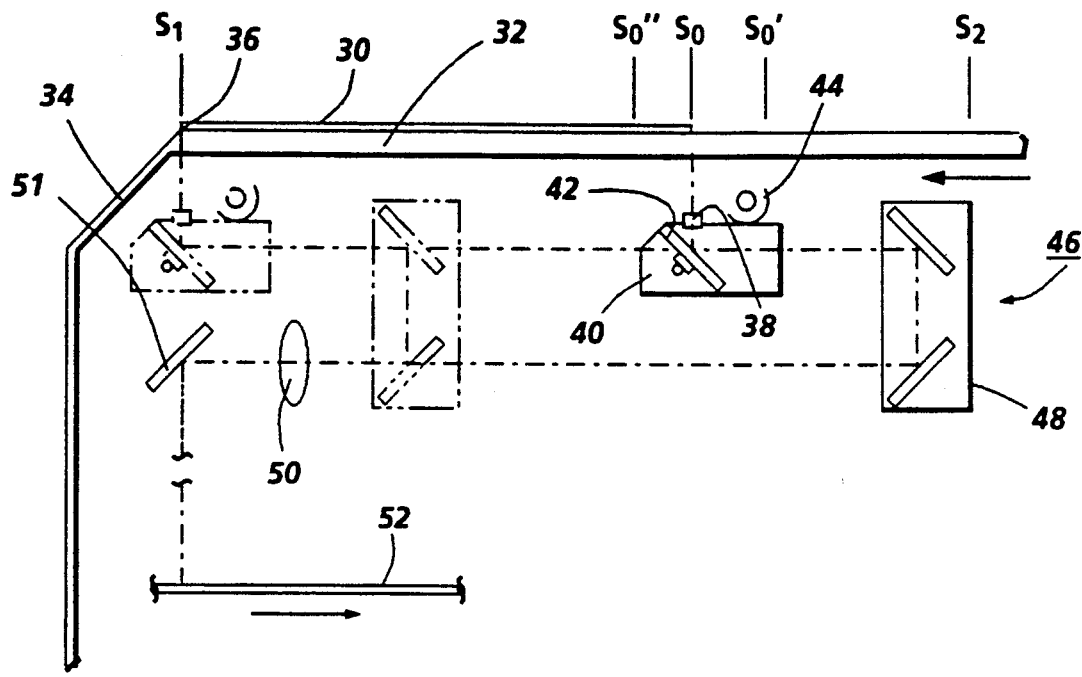
FIG. 2 illustrates, in side view, a first aspect of the invention showing a right-to-left light lens scanning system for copying in a conventional document copying mode or a book copying mode.

FIG. 2 illustrates, in side view, a right-to-left scanning system shown in a conventional copying mode for copying an original document 30 placed on platen 32. Platen 32 has been modified by adding a downwardly sloping shelf 34. The left side of document 30 is registered at a registration edge 36 coincident with the end of scan location designated as $S_1$. The right edge of the document is located, for this scanning mode, at $S_0$ by a photosensor 38 mounted on full-rate scan carriage 40. Photosensor 38 is adapted to detect a right most edge of a document or book to be copied and to send appropriate signals to the carriage drive to stop carriage 40 at a location where full rate scan mirror 42 is in proper position to begin scanning. As will be seen, other locations for start of scan position ($S_0''$, $S_0'$) are possible. Scan mirror 42 and lamp mirror assembly 44 are also mounted on full rate scan carriage 42. Half rate mirror assembly 46, mounted on half rate carriage 48, reflects light lens 50. Lens 50 projects the image via mirror 51 onto a photosensitive image plane which can be a photoreceptor belt 52. An operation begins with selection of a DOCUMENT PRINT signal. Carriage 42 has been parked in a home position following the last scan operation, the home position designated a location $S_2$. The carriage is then driven leftward until the right hand edge of the document 30 is sensed by photosensor 38. Illumination assembly 44 is energized and a scanning operation begins with a pre-scan excursion to the right, and then proceeds to scan the document from point $S_0$ to the end of scan point $S_1$. The carriage will return to the start of scan position (if multiple copies of the document are required) or will return to the home position at $S_2$ to wait the next copy operation. It will be appreciated that the right-to-left scan effectively shifts the pre-scan excursion into the larger space available to the right of the start of scan position.

Figure 3:
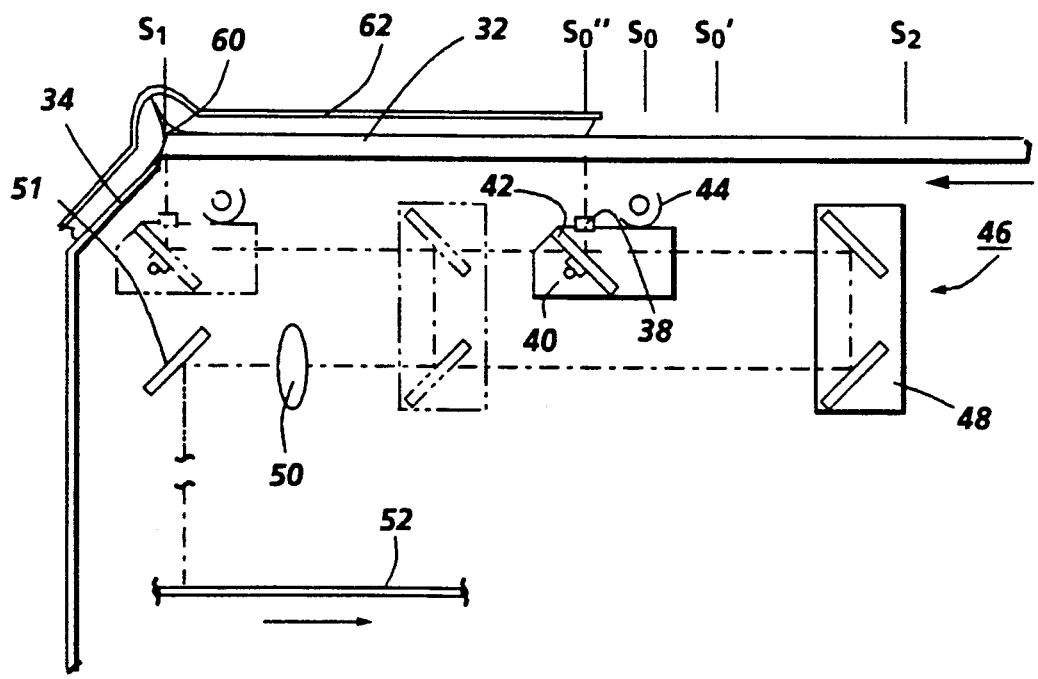
FIG. 3 illustrates the scanning system of FIG. 2 in a book scanning mode.

Turning next to operation in a book copying mode, FIG. 3 shows the same scan components as in the FIG. 2 embodiment. In operation, this mode begins with a BOOK COPY PRINT signal. Carriage 40 is moved from home position $S_2$ until sensor 38 finds the right hand edge of book 60 at position $S_0''$ which will be the start of scan position for this book copying operation. Appropriate drive signals will be sent to mirrors 42, 51, and lens 50 to effect the required degree of rotation. Scanning then proceeds right-to-left to the end of scan position.

It may be noted at this point that the document and book scanning modes may be accomplished with the system axis rotated by a small angle to allow the binding area 60 of the book to be more fully illuminated. The system axis rotation is disclosed in the aforementioned application Ser. No. 07/276,589. Briefly, lens 50 is rotated through a small angle $\theta$ mirror 42 is rotated by an angle $\theta/2$ to reflect light from the interior of binding are 60. Mirror 51 is rotated through an angle $\theta/2$ to maintain required perpendicularity at the surface of belt 52.

Figure 1:
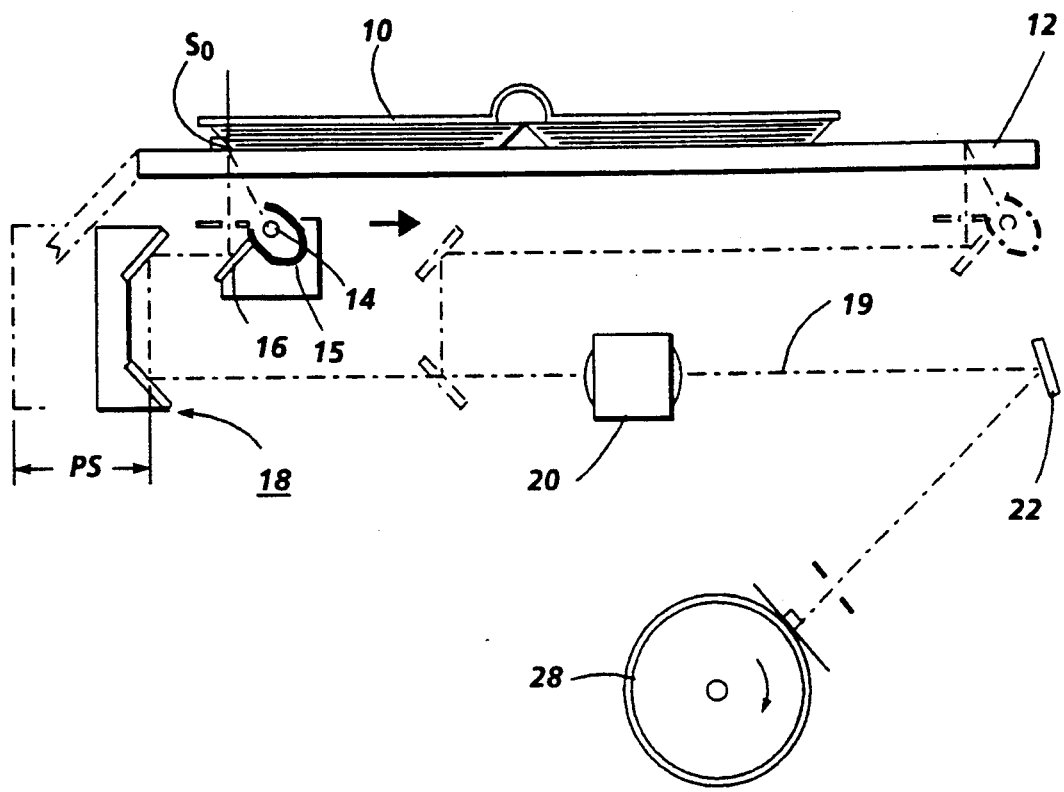
FIG. 1 illustrates, in side view, a prior art full-rate/half-rate scanning system.
Figure 5:
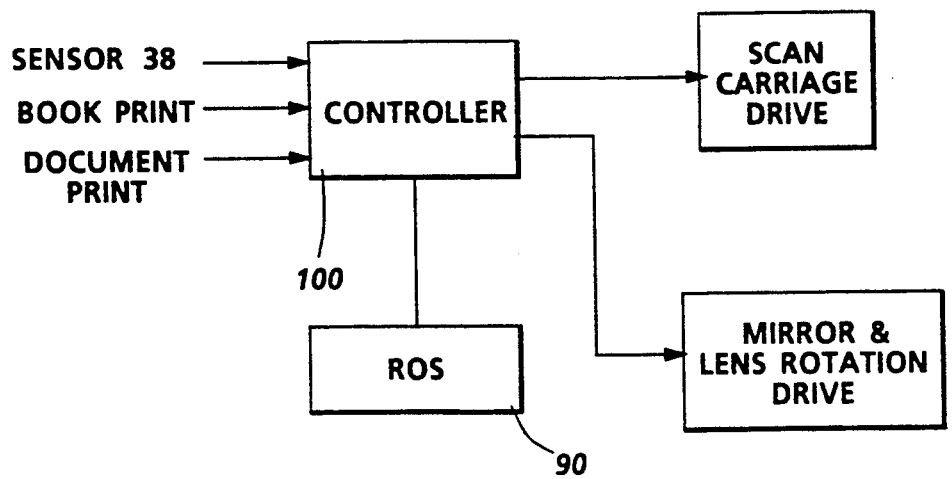
FIG. 5 is a book diagram of a control circuit to control the operation of the scan system of FIGS. 2-4.
Figure 4:
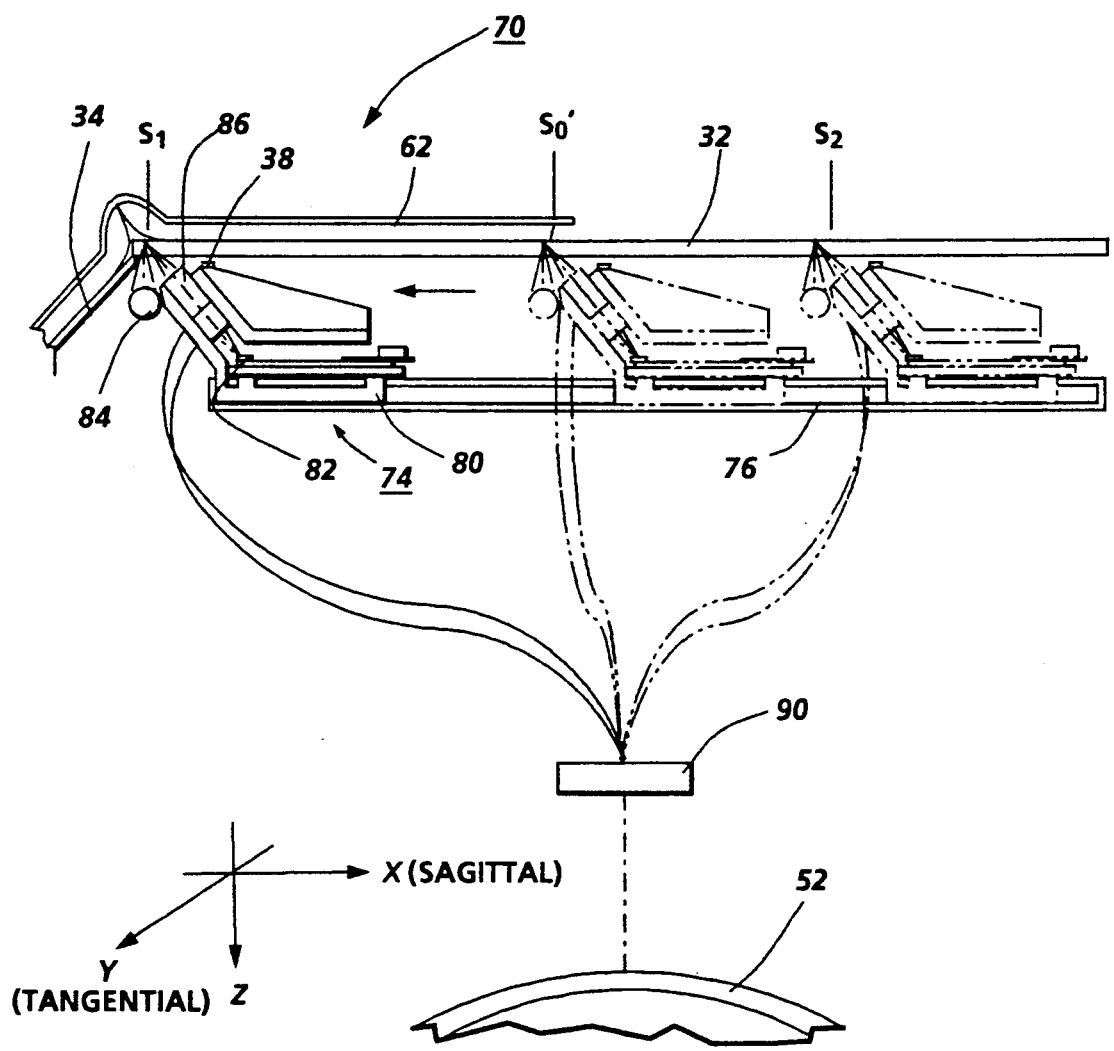
FIG. 4 illustrates a second application of the invention whereby a right-to-left RIS scan system is implemented.

According to another aspect of the invention, a RIS right-to-left scanning operation can also be effected using the principles of the present invention. As shown in FIG. 4, the scan system is in a book scan mode. Here, a raster input scanner assembly 70 is located beneath platen 32. Assembly 70 includes a scanning array assembly 74 supported for reciprocating scanning movement by two support rails 76, only one of which is shown. Rails 76 are located in a frame portion of the housing and extend parallel to the platen. Scanning array assembly 74 is supported on support carriage 80 which is movably mounted on rails 76 by bearings or bushings at the frictional interface. Array 82, which may be a linear array of photosensitive scanners such as CCD's or photodiodes controlled to sense light reflected from a document during an integration period, is supported on carriage 80. Array 82 develops a charge indicative of the amount of light detected, and generates output signals sent to a controller 100 (FIG. 5).

Book 60, placed on platen 32, is illuminated by lamp 84. According to another aspect of the present invention, this embodiment enables lamp 84 to be advantageously positioned directly beneath the platen in a plane normal to the platen thereby reducing paste-up problems which are present when the lamp is positioned to the left or the right of the normal plane. The lamp, when energized by a power supply (not shown), directs light towards the platen. Light from the illuminated book or document is reflected to tilted lens 86, comprising a bundle of image transmitting fiber lenses produced under the tradename of "SELFOC" by Nippon Sheet Glass Company, Limited. Lens 86 transmits light reflected from the document to scanning array 82. As in the conventional light lens copying operation, a sensor 38 is mounted on support member 80.

Electrical output signals from array 82 are used to control the operation of a raster output scanner (ROS) unit 90. ROS 90 forms a modulated light pattern on the charged surface of a photoreceptor drum 92. Because of the tilted nature of lens 86, light from the binding areas is transmitted and book copying fully enabled. Control of the RIS and ROS operation, and the various xerographic stations is accomplished by an onboard microprocessor controller 100 of the type commonly used to control light lens and raster scanners, modified according to the requirements of the present invention, and as shown in FIG. 5.

In operation, in response to a BOOK PRINT signal, carriage 80, parked at home position $S_2$ moves from right-to-left until sensor 38 detects the right hand edge of book 60 setting the start of scan position at $S_0'$. After the pre-scan excursion, the carraige 80 is then driven from $S_0'$ to the end of scan position $S_1$. As the scanning assembly is moved across the platen, the scanning array 82 generates analog output signals representative of the scanned document.

To obtain satisfactory image quality the extent of the imaged object plane should be less than 0.25 mm in the x, or sagittal, direction. The image sensor array 82 must be centered within 0.25 mm of the nominal center line lens array 86.

FIG. 5 is a schematic block diagram of the control system for accomplishing the scan functions. Signals indicating a book or document mode selection, and outputs from edge sensor array 38 are sent to controller 100. The control utilizes the signals to cause rotation of the optical elements, if required for the light lens book copying mode controls the re-scan, scan, pre-scan, and home movements of the scan carriages, and controls operation of the ROS 90.

While the invention has been described with reference to the structure disclosed, it will be appreciated that numerous changes and modifications are likely to occur to those skilled in the art. For example, while the embodiment of FIG. 2 showed a document with a left hand registration, a right hand registration may also be used for certain system with the registration position being to the left of home position $S_2$ All such changes and modifications are intended to fall within the spirit and scope of the invention.

I claim:

1. An optical scanning and imaging system for scan-/illuminating a document placed on a document platen and for projecting an image along an optical path onto a photosensitive image medium to form a latent image of the document thereon, said optical scanning and imaging system comprising, in combination an illumination and imaging assembly including:

a document illumination lamp, and a scan mirror, said assembly adapted to move beneath said platen in a scanning mode in a right-to-left scan operation beginning at a start of scan position $S_0$ coinciding with the right edge of the document, said illumination and imaging assembly further including a photosensor means adapted to detect the right edge of the document to be scanned and to generate a signal indicating such detection, and control means adapted to enable a right-to-left scanning operation beginning at the start of scan position $S_0$ upon receipt of the detection signal from the photosensor means.

2. The scanning imaging system of claim 1 wherein, there are a plurality of start of scan positions, each associated with a different document right edge location, said photosensor means being adapted to detect each of said different document right edge locations.

3. The scanning and imaging system of claim 1 wherein said platen incorporates an outwardly sloping book edge, and wherein said document is a book positioned with the binding area aligned along the book edge and wherein said imaging means is a RIS scanning device incorporating a gradient index lens which is tilted so as to transmit light reflected from the binding area.

4. The imaging system of claim 3 wherein an end of scan position $S_1$ is coincident with said binding area aligned along the book edge and wherein said illumination means is positioned in a plane normal to said end of scan position $S_1$.

* * * * *